United States Patent
Dunn

(10) Patent No.: US 10,261,107 B2
(45) Date of Patent: Apr. 16, 2019

(54) SCANNING RESONATOR MICROSCOPY

(71) Applicant: University of Kansas, Lawrence, KS (US)

(72) Inventor: Robert Conley Dunn, Lawrence, KS (US)

(73) Assignee: UNIVERSITY OF KANSAS, Lawrence, KS (US)

(*) Notice: Subject to any disclaimer, the term of this patent is extended or adjusted under 35 U.S.C. 154(b) by 0 days.

(21) Appl. No.: 15/562,499

(22) PCT Filed: Mar. 30, 2016

(86) PCT No.: PCT/US2016/024879
§ 371 (c)(1),
(2) Date: Sep. 28, 2017

(87) PCT Pub. No.: WO2016/160909
PCT Pub. Date: Oct. 6, 2016

(65) Prior Publication Data
US 2018/0095107 A1  Apr. 5, 2018

Related U.S. Application Data

(60) Provisional application No. 62/140,689, filed on Mar. 31, 2015.

(51) Int. Cl.
*G01Q 60/06* (2010.01)
*G01Q 60/22* (2010.01)
*G01Q 60/38* (2010.01)

(52) U.S. Cl.
CPC ............. *G01Q 60/06* (2013.01); *G01Q 60/22* (2013.01); *G01Q 60/38* (2013.01)

(58) Field of Classification Search
CPC .......... G01Q 60/06; G01Q 60/22; G01Q 60/38
(Continued)

(56) References Cited

U.S. PATENT DOCUMENTS 5,260,567 A  11/1993  Kuroda et al.
7,347,085 B2  3/2008  Taber
(Continued)

OTHER PUBLICATIONS

Gordon et al., Multiplexed Label-Free Biosensing Using Whispering Gallery Mode Imaging, Bioanalytical Sensors Conference, Jun. 22, 2014, Newport, RI.
(Continued)

*Primary Examiner* — Nicole M Ippolito
*Assistant Examiner* — Hanway Chang
(74) *Attorney, Agent, or Firm* — Bell & Manning, LLC

(57) ABSTRACT

A method of imaging a sample via scanning resonator microscopy is provided comprising positioning a whispering gallery mode (WGM) optical resonator at a first location over the surface of the sample, the WGM optical resonator characterized by at least one resonance frequency, wherein the WGM optical resonator is mounted to the free end of an atomic force microscopy (AFM) cantilever such that the WGM optical resonator moves with the AFM cantilever, and wherein the AFM cantilever is operably coupled to an AFM system configured to provide a topographical image of the sample; evanescently coupling excitation light into the WGM optical resonator; detecting light derived from the excitation light to monitor for a shift in the at least one resonance frequency induced by the surface of the sample; and repeating steps (a)-(c) at least at a second location over the surface of the sample.

20 Claims, 8 Drawing Sheets

(58) Field of Classification Search
USPC .............. 850/21, 22, 30, 31, 32, 33, 36, 40
See application file for complete search history.

(56) References Cited

U.S. PATENT DOCUMENTS

| | | |
|---|---|---|
| 8,037,762 B2 | 10/2011 | La Rosa Flores et al. |
| 8,082,593 B2 | 12/2011 | Sarioglu et al. |
| 8,649,000 B1 | 2/2014 | Anderson |
| 2003/0085351 A1 | 5/2003 | Nakajima et al. |
| 2004/0089816 A1 | 5/2004 | Quake et al. |
| 2004/0248318 A1 | 12/2004 | Weinberger et al. |
| 2006/0037401 A1 | 2/2006 | Shekhawat et al. |
| 2010/0115674 A1 | 5/2010 | Fujimoto et al. |
| 2010/0245816 A1 | 9/2010 | Shen et al. |
| 2012/0218559 A1 | 8/2012 | Dell et al. |

OTHER PUBLICATIONS

International Search Report and Written Opinion mailed in PCT Application No. PCT/US2016/024879, dated Jun. 27, 2016.

Amini et al., Using the atomic force microscope as a nanomechanical partner to support evanescent field imaging, Eur. Phys. J. Special Topics 223, Oct. 6, 2014, pp. 2023-2033.

Ghislain et al., Near-field scanning solid immersion microscope, Applied Physics Letters, vol. 72, No. 22, Jun. 1, 1998, pp. 2779-2781.

Kim et al., Integrating Whispering Gallery Mode Refractive Index Sensing with Capillary Electrophoresis Separations Using Phase Sensitive Detection, Anal. Chem. 88, Dec. 12, 2015, pp. 1426-1433.

Vickery et al., Scanning Near-Field Fluorescence Resonance Energy Transfer Microscopy, Biophysical Journal, vol. 76, Apr. 1999, pp. 1812-1818.

Min et al., High-Q surface-plasmon-polariton whispering-gallery microcavity, Nature, vol. 457, Jan. 22, 2009, pp. 455-458.

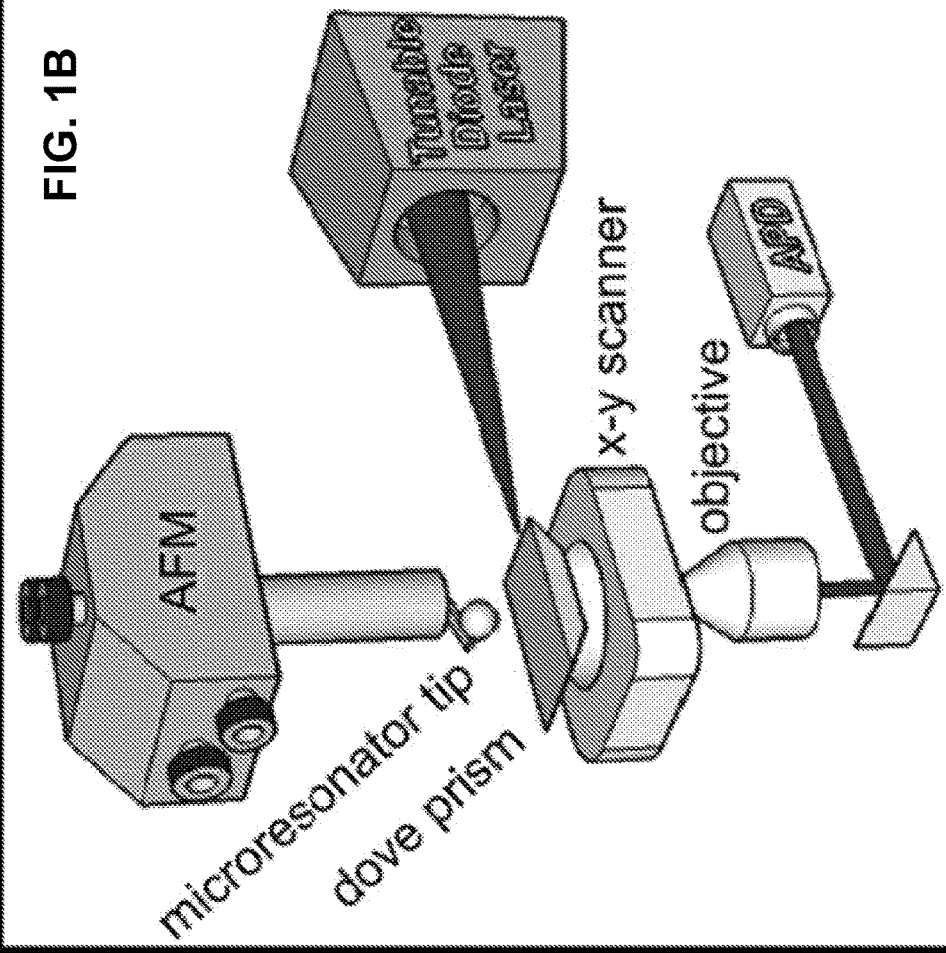
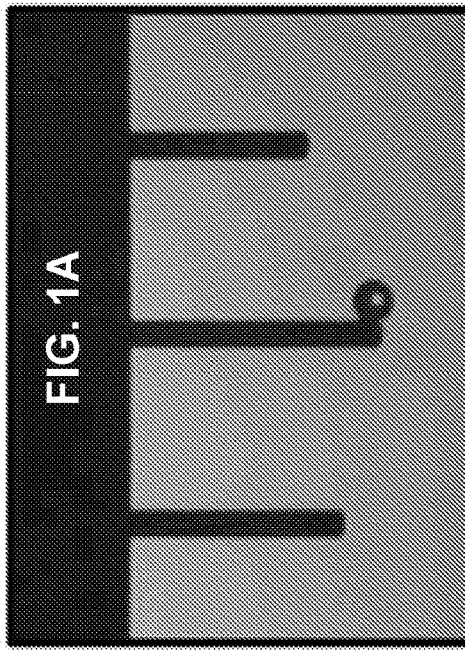
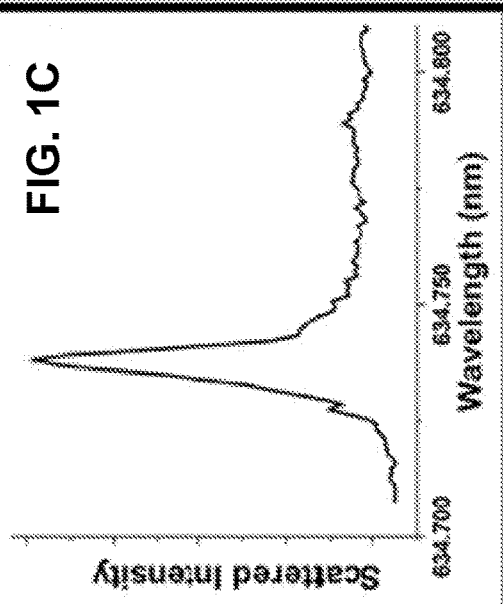

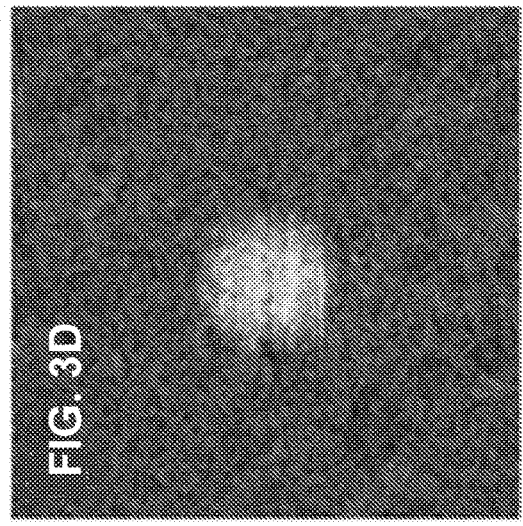
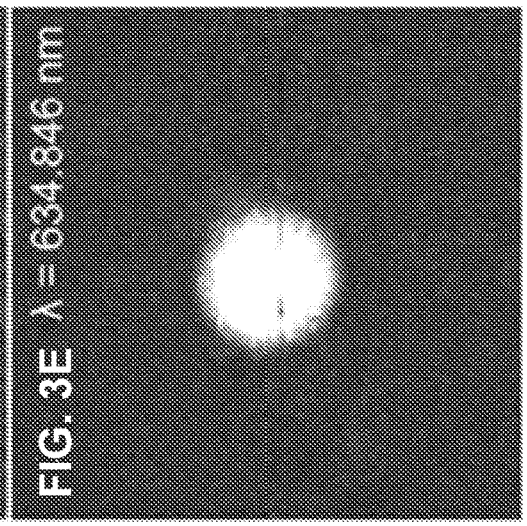
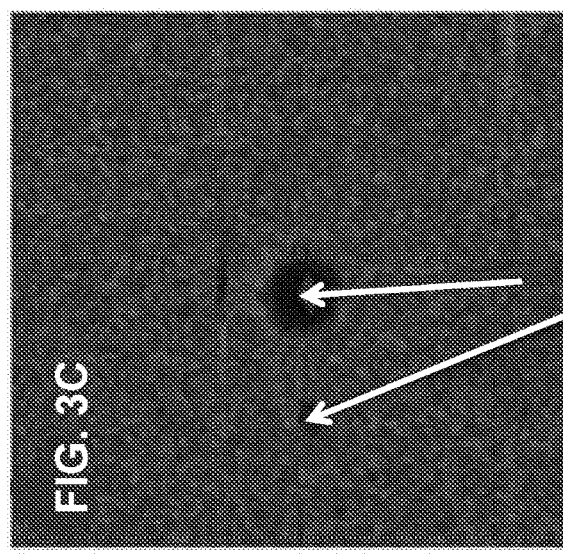
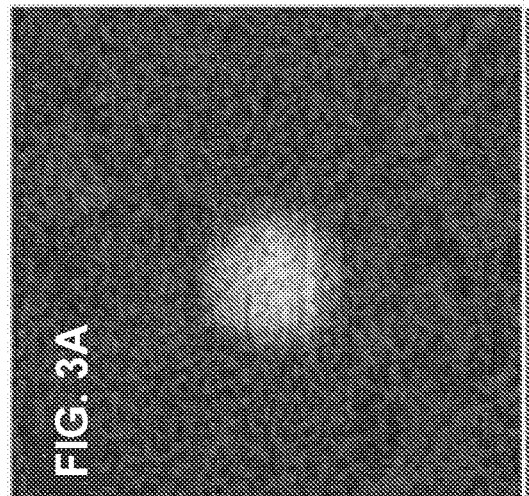
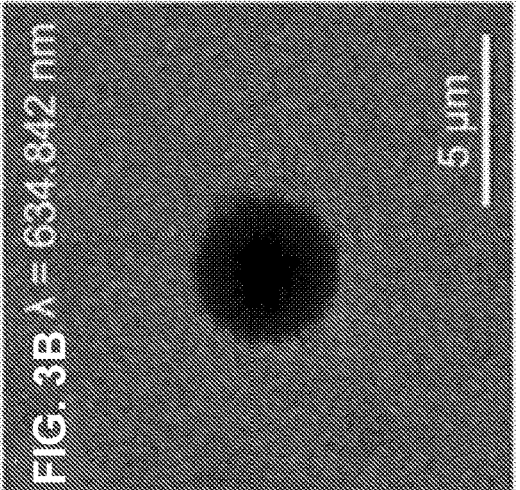

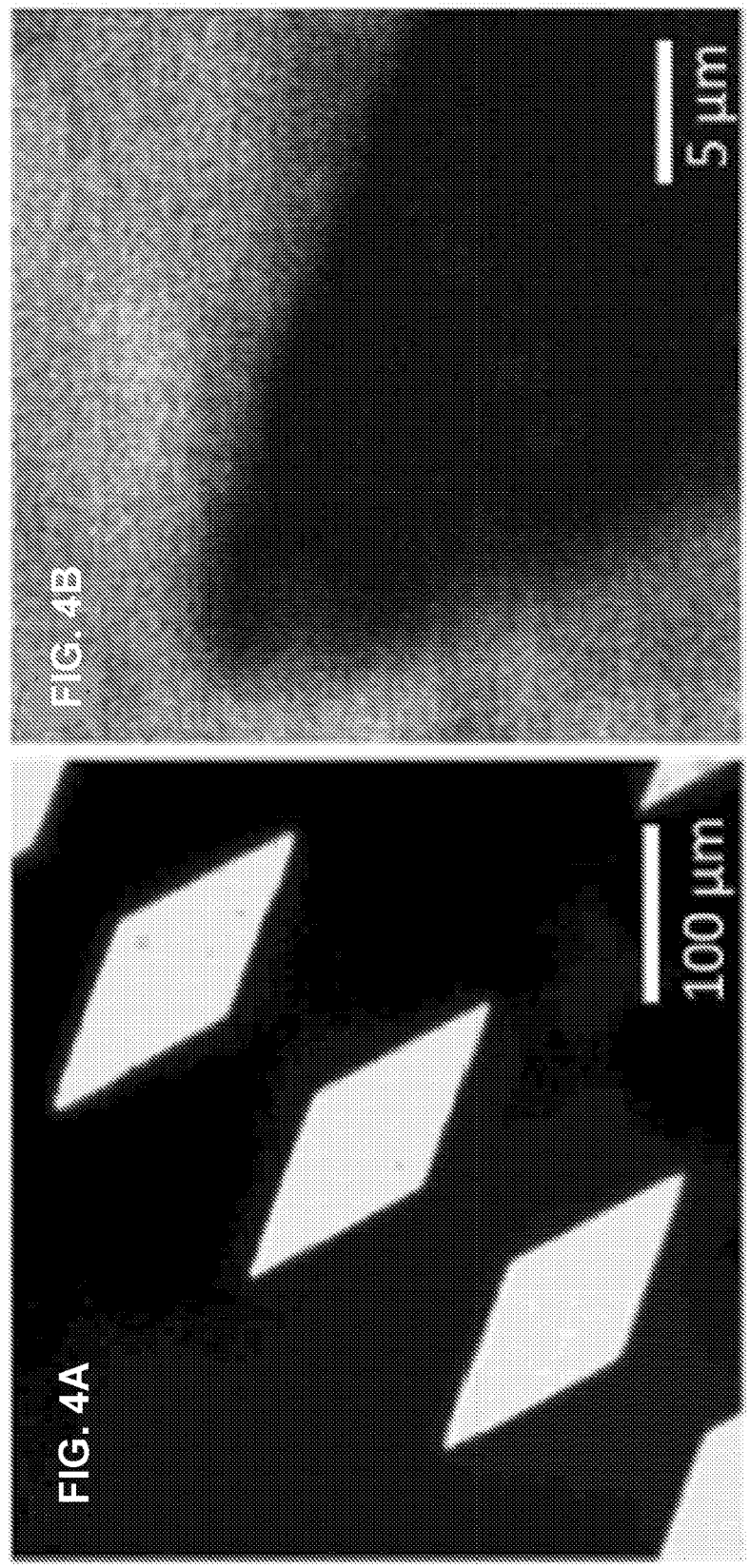

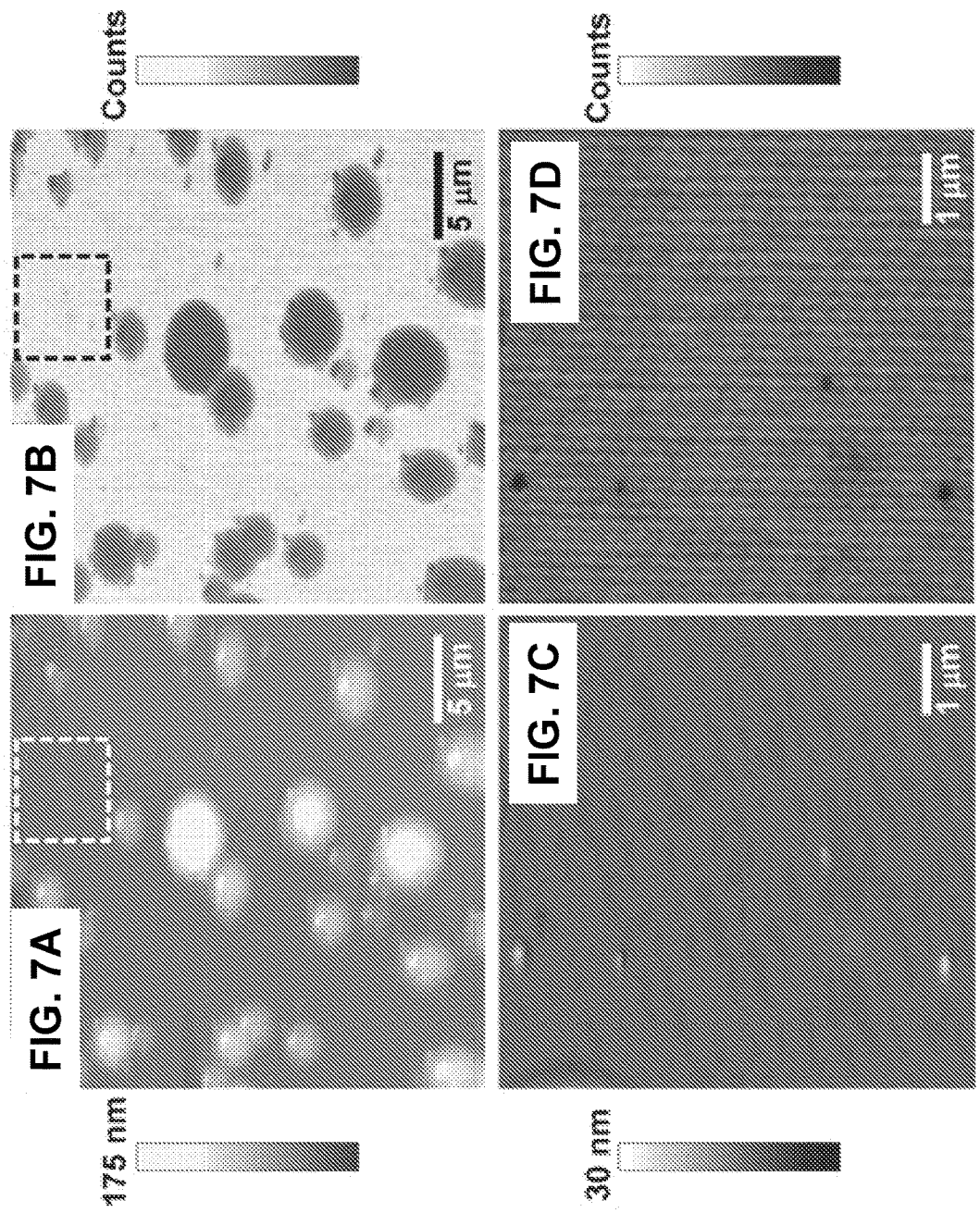

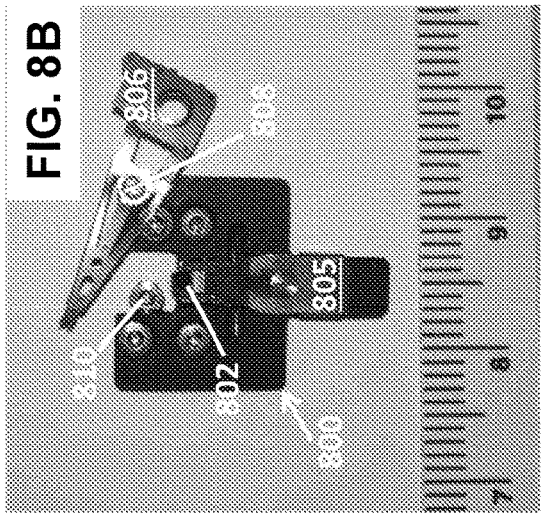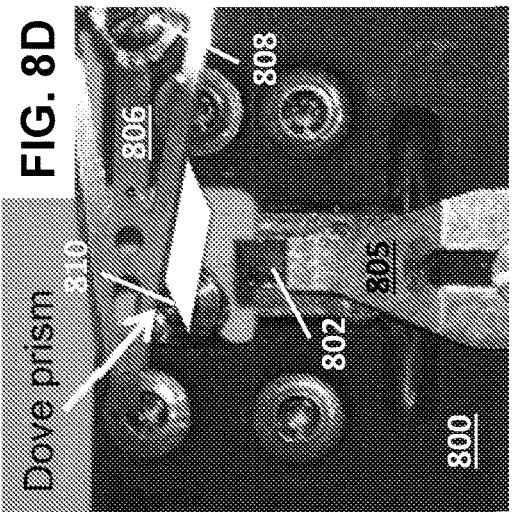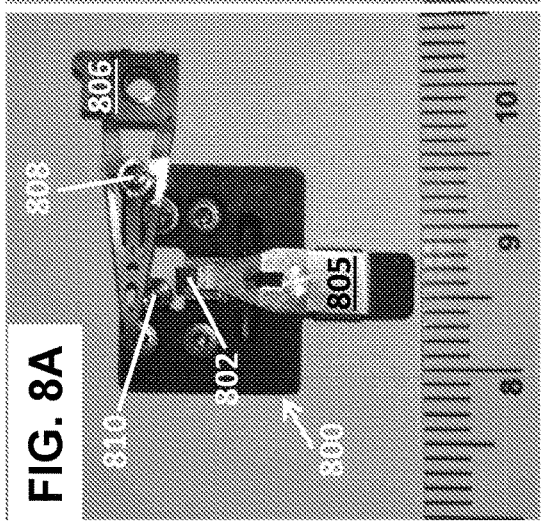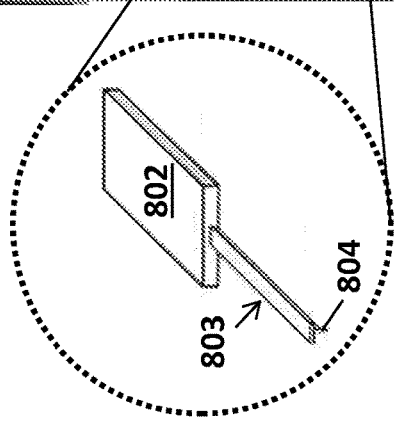

SCANNING RESONATOR MICROSCOPY

CROSS-REFERENCE TO RELATED APPLICATIONS

The present application is a National Stage Entry of International Application No. PCT/US2016/024879 that was filed on Mar. 30, 2016, the entire contents of which are hereby incorporated by reference; which claims priority to U.S. Provisional Patent Application No. 62/140,689 that was filed Mar. 31, 2015, the entire contents of which are hereby incorporated by reference.

REFERENCE TO GOVERNMENT RIGHTS

This invention was made with government support under 1133814 awarded by the National Science Foundation. The government has certain rights in the invention.

BACKGROUND

Scanning probe microscopies (SPM) encompass a suite of techniques capable of probing surfaces with high spatial resolution.[1-2] Atomic force microscopy (AFM) revolves around sensing mechanical forces between the tip and the sample and affords great flexibility in sample composition and working environment.[4] AFM measurements on samples ranging from solid-state materials to soft biological tissues have been reported in environments ranging from vacuums to aqueous solutions.[5-6]

Hybrid techniques incorporating AFM have been developed.[2-3,7-8] For example, in chemical force microscopy (CFM), tips modified with specific functional groups have been used to probe adhesion or frictional forces between the tip and surface of interest.[9-10] More specific interactions have also been probed with tips functionalized with antibodies or other specific recognition sites.[10-11] As another example, electrochemical measurements have been integrated with AFM to develop scanning electrochemical microscopy (SECM-AFM).[8, 12-13] This enables for simultaneous measurement of topography and electrochemical properties at the mesoscale. Variations of this approach have been applied to imaging redox-labeled nanoparticles and, in the life sciences, for studying enzyme activity and cellular oxidation events.[14-15] As another example, metal coated AFM tips have been used to develop tip-enhanced Raman spectroscopy (TERS).[16] Most work in this area, however, has focused on combining fluorescence sensitivity with the high-resolution force mapping. This combination is particularly informative in biological samples where correlations between fluorescently labeled species and surface topography can yield new structural insights. The most successful implementation is near-field scanning optical microscopy (NSOM) which uses specially fabricated fiber optic probes to deliver light to the nanometric dimension.[17] This approach provides high-resolution fluorescence and topography information with single molecule detection limits.[18]

Refractive index probes a fundamental parameter of a material. Mapping the refractive index of a material is useful given recent developments in photonics and energy applications.[20-22] Refractive index is also used to monitor binding events at surfaces for applications in sensing and screemng.[23-25] Unlike fluorescence measurements, refractive index sensing does not require an intrinsic fluorophore or external tag and is not limited by photobleaching. Refractive index sensitivity with AFM has been implemented using both surface plasmon resonance and ellipsometric approaches.[26-29]

SUMMARY

Provided herein are methods of imaging samples via scanning resonator microscopy (SRM). Also provided are systems for carrying out the methods.

In one aspect, a method of imaging a sample via scanning resonator microscopy is provided. In some embodiments, the method comprises positioning a whispering gallery mode (WGM) optical resonator at a first location over the surface of the sample, the WGM optical resonator characterized by at least one resonance frequency, wherein the WGM optical resonator is mounted to the free end of an atomic force microscopy (AFM) cantilever such that the WGM optical resonator moves with the AFM cantilever, and wherein the AFM cantilever is operably coupled to an AFM system configured to provide a topographical image of the sample; evanescently coupling excitation light into the WGM optical resonator; detecting light derived from the excitation light to monitor for a shift in the at least one resonance frequency of the WGM optical resonator; and repeating steps (a)-(c) at least at a second location over the surface of the sample.

In another aspect, a scanning resonator microscopy system is provided. In some embodiments, the system comprises a stage configured to support a sample; a WGM optical resonator characterized by at least one resonance frequency mounted to the free end of an AFM cantilever such that the WGM optical resonator moves with the AFM cantilever; an AFM system configured to provide a topographical image of the sample, wherein the AFM cantilever is operably coupled to the AFM system; optical components configured to evanescently couple excitation light into the WGM optical resonator; and a detector configured to detect light derived from the excitation light to monitor for a shift in the at least one resonance frequency of the WGM optical resonator.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A shows a magnified view of an atomic force microscopy (AFM) cantilever with 45 μm diameter barium titanate microsphere attached on the side. FIG. 1B shows a schematic of a scanning resonator microscopy (SRM) platform that combines whispering gallery mode (WGM) sensing with AFM. The microresonator tip was held in an AFM head that adjusts the tip vertically in contact-mode feedback. The sample below was mounted on a Dove prism which was held in an x-y piezo scanner to scan the sample under the tip. Excitation light from a tunable diode laser was directed into the Dove prism creating an evanescent wave at the sample surface to excite WGMs in the microresonator tip. Evanescently scattered excitation from the tip was collected from below and detected on an avalanche photodiode (APD). FIG. 1C shows a WGM spectrum of the microresonator tip shown in FIG. 1A measured by tuning the diode laser while measuring the scattered excitation. The spectrum was collected with the tip held in contact-mode at a glass surface under aqueous conditions.

FIG. 2A shows calibration based on changes in sucrose concentration of the surrounding solution. FIG. 2B shows the same microresonator tip calibrated using changes in substrate refractive index while holding the surrounding refractive index constant (nanopure water).

FIGS. 3A-3E include SRM topography and optical images. FIG. 3A shows a SRM topography image and FIG. 3B shows a SRM optical image of a cleaned glass substrate under aqueous conditions. The excitation wavelength was held constant at 634.842 nm, which corresponds to the WGM resonance of the tip on glass. The topography image reveals a small 36 nm high feature in the center of the image that corresponds to a large decrease in scattered intensity from the microresonator tip. FIG. 3C shows that spectra collected on and off the feature confirm that the intensity decrease observed in FIG. 3B arises from a shift of the WGM resonance of the tip. FIG. 3D shows a SRM topography image and FIG. 3E shows a SRM optical image of the same sample region with the excitation now held at 634.846 nm which corresponds to the WGM resonance of the tip on the feature. An increase in intensity is observed as the tip comes into resonance while scanning across the feature.

FIG. 4A shows a photolithography mask used to pattern thin films of the photoresist AZ1518 with UV radiation. FIG. 4B shows an SRM optical image of a thin polymer film following UV exposure. Scattered intensity decreases in UV exposed regions of the film as the WGM resonance of the microresonator tip shifts due to refractive index changes. Spectra were collected in air at room temperature.

FIGS. 7A-7D show images of a polymeric thin film. FIG. 7A shows a SRM topographical image. FIG. 7B shows a SRM optical image. FIG. 7C is an expanded image corresponding to the white dotted square in FIG. 7A. FIG. 7D is an expanded image corresponding to the black dotted square in FIG. 7B.

FIGS. 8A-8D show a modified AFM cantilever holder according to an illustrative embodiment. Two positions of an evanescent coupler positioner mounted to the AFM cantilever holder are shown in FIGS. 8A and 8B. A tapered or thinned optical fiber is shown mounted to the evanescent coupler positioner in FIG. 8C and a Dove prism is shown mounted to the evanescent coupler positioner in FIG. 8D.

DETAILED DESCRIPTION

Figure 2A:
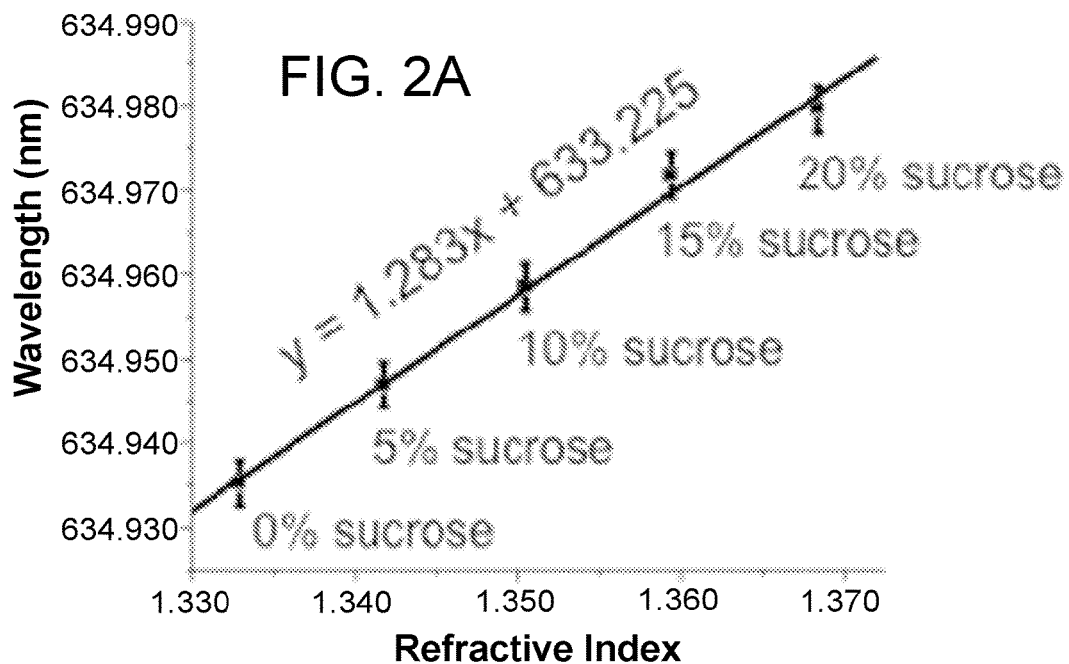
FIGS. 2A-2B show refractive index calibration plots for a microresonator tip.

Provided herein are methods of imaging samples via scanning resonator microscopy (SRM). Also provided are systems for carrying out the methods.

The technique of scanning resonator microscopy (SRM) combines refractive index sensing with atomic force microscopy (AFM) by integrating a small optical resonator at the end of an AFM probe. Small, dielectric spheres (e.g., tens of microns in diameter) are attached to AFM probes as the optical resonators.[30-33] The resonators are used to sense surface refractive index through changes in their whispering gallery mode resonances.

Light evanescently coupled into axially symmetric dielectric structures, such as a glass microsphere, can undergo nearly total internal reflection at each interaction with the dielectric interface.[23-25, 34-38] When the light circumnavigates the microsphere and returns in phase, constructive interference leads to morphology dependent resonances known as whispering gallery modes (WGM). These quasi-modes are given by:

$$\lambda = \frac{2\pi r n_{\mathit{eff}}}{m} \qquad \text{(Equation 1)}$$

wherein $\lambda$ is the wavelength of light, r is the radius of the resonator, m is an integer, and $n_{\mathit{eff}}$ is the effective or orbital refractive index of the sphere. Refractive index changes, therefore, lead to shifts in the WGM resonance.[23, 34-38]

Microsphere resonators may be fabricated in a range of sizes and materials and, since they are formed from melts, have exceptionally smooth surfaces that contribute to large quality factors (Q-factors).[34] High Q resonators have long effective path lengths as trapped light circulates within the resonator.[24, 36] This, combined with their narrow spectral linewidth (pm), leads to sensitive refractive index detection in a compact structure. By integrating a WGM resonator at the end of an AFM cantilever, it is possible to simultaneously map surface refractive index with topography. As described in the Examples, calibration plots confirmed that the WGM resonance of the tip bound resonator shifts linearly with changes in substrate refractive index. The optical resonator also acts as the stylus in contact-mode AFM, enabling surface topographical features to be directly correlated with changes in surface refractive index. As described in the Examples, below, studies were carried out on a range of samples to validate the approach and demonstrate the potential of this new surface characterization technique.

In one aspect, methods of imaging a sample via SRM are provided. In one embodiment, a method of imaging a sample comprises positioning a whispering gallery mode (WGM) optical resonator at a first location over the surface of a sample, wherein the WGM optical resonator is mounted to the free end of an atomic force microscopy (AFM) cantilever and wherein the AFM cantilever is operably coupled to an AFM system configured to provide a topographical image of the sample. The method further comprises coupling excitation light into the WGM optical resonator and detecting light derived from that excitation light. The method further comprises repeating these steps at least at a second location over the surface of the sample. The steps may be repeated at a sufficient number of locations over the surface of the sample to generate an optical image of the sample simultaneously with the topographical image.

As further described below, detection of the light derived from the excitation light generates optical information or an optical image which is quantitatively related to shifts in the resonance frequencies of the WGM optical resonator due to changes in the refractive index across the surface of the sample being analyzed. Thus, the disclosed methods are capable of providing a surface refractive index map of the sample. Changes in the surface refractive index may be due to local compositional or structural changes in the material at the surface of the sample or due to a change in local temperature of the surface (or combinations thereof). Thus, the disclosed methods may also be used to sense and quantify events (e.g., binding events) which result in such local compositional, structural, and temperature changes. Since the disclosed methods are also capable of simultaneously generating topographical information or a topographical image, changes in the surface refractive index may be directly correlated to structural features or the topography of the sample being characterized. Thus, the disclosed methods may be used in surface characterization applications and in sensing and screening applications.

By "WGM optical resonator," it is meant any optical resonator which is capable of supporting whispering gallery modes, electromagnetic waves which propagate at the edge of the optical resonator, as discussed above. The WGM optical resonator may be characterized by its resonance frequencies (see Equation 1), those frequencies at which light can be most strongly coupled into and propagate in the optical resonator. The WGM optical resonator may be characterized by its quality factor, Q-factor. In some embodiments, the WGM optical resonator is characterized by a Q-factor of at least about $10^4$, at least about $10^5$, at least about $10^6$, at least about $10^7$, etc. The WGM optical resonator may be distinguished from quantum dot/microsphere structures such as those disclosed in Amini et al., Eur. Phys. J. Special Topics 223, 2023-2033 (2014), which are characterized by a Q-factor of about 100.

The WGM optical resonator may assume a variety of shapes, e.g., a sphere, a cylinder, a toroid, a disk, etc. The WGM optical resonator may assume a variety of dimensions. By way of illustration, the WGM optical resonator may be characterized by a diameter in the range of from about 10 μm to about 50 μm. This includes embodiments in which the diameter is in the range of from about 10 μm to about 30 μm or from about 10 μm to about 15 μm.

The WGM optical resonator may be formed from a variety of transparent materials, depending upon the desired characteristic, e.g., resonance frequencies, Q-factor, etc. By transparent it is meant that the material is substantially transparent at one or more of the resonance frequencies of the WGM optical resonator. Suitable exemplary transparent materials include a variety of semiconductors, glasses and crystals, e.g., silica, $CaF_2$, $MgF_2$, $LiNbO_3$, $BaTiO_3$, etc. In some embodiments, the WGM optical resonator does not comprise quantum dots embedded therein, such as the quantum dot/microsphere structures disclosed in Amini et al., Eur. Phys. J. Special Topics 223, 2023-2033 (2014).

In some embodiments, the WGM optical resonator is uncoated and/or unfunctionalized, by which it is meant that the surface of the WGM optical resonator is substantially free of a coating material and/or substantially free of individual molecules from which the coating material is formed, e.g., substantially free of biological molecules such as proteins, antibodies, enzymes, oligonucleotides, etc., and/or a layer of such biological molecules. However, in some embodiments, the WGM optical resonator is coated and/or functionalized, e.g., with such biological molecules or a layer of such biological molecules. In some embodiments the resonator may be functionalized with recognition elements for specific sensing.

In some embodiments, the WGM optical resonator is coated with a layer of a metal, e.g., silver or gold. Excitation light coupled to such metal coated WGM optical resonators can generate surface plasmon polaritons which are sensitive to changes in local refractive index. Such metal coated WGM optical resonators can exhibit enhanced sensitivity to changes in surface refractive index. In some such embodiments, a tapered optical fiber is used as an evanescent-field coupler to couple excitation light into the WGM optical resonator. The WGM optical resonator may be attached to the end of the tapered optical fiber and the entire assembly coated with the layer of metal so as to ensure the light is efficiently coupled from the tapered optical fiber into the attached WGM optical resonator.

The WGM optical resonator is mounted to the free end of an AFM cantilever. As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, abut, and other like terms. The phrases "mounted to," "mounted on," and equivalent phrases indicate any interior or exterior portion of the element reference. These phrases also encompass direct mounting (in which the referenced elements are in direct contact) and indirect mounting (in which the referenced elements are not in direct contact, but are connected through an intermediate element). Elements referenced as mounted to each other herein may further be integrally formed together, for example, using a molding or thermoforming process. As a result, elements described herein as being mounted to each other need not be discrete structural elements. The elements may be mounted permanently, removably, or releasably unless specified otherwise.

The mounting configuration of the WGM optical resonator on the AFM cantilever (e.g., the type of mounting and the position, orientation, etc. of the WGM optical resonator with respect to the AFM cantilever) is that which allows the WGM optical resonator to function as the tip (i.e., that portion of the AFM cantilever brought closest to or in contact with the surface of the sample) of the AFM cantilever. The mounting configuration may also be that which minimizes or prevents substantial interference with the ability of the WGM optical resonator to support whispering gallery modes upon coupling of light into the WGM optical resonator. By way of illustration, a suitable mounting configuration is shown in FIGS. 1A and 1B. The AFM cantilever of FIGS. 1A and 1B comprises a top surface and a bottom surface and a front surface, a back surface and side surfaces extending between the top and bottom surfaces. As shown in FIGS. 1A and 1B, the WGM optical resonator may be mounted to one of the side surfaces of the AFM cantilever (e.g., via a layer of an adhesive). Other mounting configurations may be used. By way of another illustration, the WGM optical resonator may be mounted to the tip of the AFM cantilever. A variety of commercially available AFM cantilevers may be used, including tipless AFM cantilevers. The use of tipless AFM cantilevers enables smaller WGM optical resonators to be attached, thus increasing spatial resolution.

The AFM cantilever is operably coupled to an AFM system configured to provide a topographical image of a sample. The AFM system may include a variety of conventional components used for providing topographical images via atomic force microscopy, e.g., AFM head, AFM controller, etc. The AFM system is configured to move the AFM cantilever, the sample, or some combination of both, in the x, y and/or z directions. By way of illustration, as shown in FIG. 1B, the AFM head may be configured to move the AFM cantilever relative to the sample in the z direction while a separate stage configured to support the sample is configured to move the sample relative to the AFM cantilever in the x and y directions. The AFM system may be configured to detect the deflection of the AFM cantilever due to interaction with the surface of the sample via laser beam deflection. The AFM system may be configured to operate in contact mode. Other deflection detection mechanisms and imaging modes may be used.

In the disclosed methods, excitation light is coupled into the WGM optical resonator. The wavelength of the excitation light may be that which substantially matches a resonance frequency of the WGM optical resonator (see Equation 1) in order to excite a whispering gallery mode of the WGM optical resonator. This resonance frequency may be the resonance frequency of the WGM optical resonator as determined under a particular control environment. The control environment may be the WGM optical resonator near to or in contact with a particular substrate (e.g., glass) or a particular control sample or a particular area of the test sample under air or aqueous conditions. Other control environments may be used. Thus, the particular wavelength of the excitation light will depend upon the particular WGM optical resonator and the particular control environment. The wavelength of the excitation light may be fixed or may be tuned over a range of wavelengths, including a range which encompasses a wavelength which is substantially resonant with the WGM optical resonator.

Various techniques for coupling the excitation light into the WGM optical resonator may be used. Evanescent-field coupling techniques may be used, involving evanescent-field couplers such as prisms, thinned optical fibers, tapered optical fibers, etc. Other coupling methods may be used. As shown in FIG. 1B, a dove prism mounted underneath the WGM optical resonator is used as an evanescent-field coupler. Evanescent-field coupling techniques, which directly excite the WGM modes in the WGM optical resonator via near-field light, are distinguished from techniques which make use of far-field light to indirectly excite microspheres via quantum dots embedded therein, such as those disclosed in Amini et al., Eur. Phys. J. Special Topics 223, 2023-2033 (2014).

Configurations in which an evanescent coupler rides with the WGM optical resonator on the AFM cantilever may also be used. Such configurations enable measurements on opaque samples and samples with large topography changes. Such configurations also completely decouple the topography and optical signals and enable the coupler/resonator gap to be tuned towards the critical coupling condition, where resonator Q is maximized.[42] For example, a tapered or thinned optical fiber may be mounted to the AFM cantilever (or to a holder for the AFM cantilever) in a position which is sufficiently close to the surface of the WGM optical resonator so that the evanescent field generated by light traveling down the fiber can couple into the WGM optical resonator. A Dove prism (e.g., Edmund Optics, Stock #85-155) may be similarly mounted.

Illustrative configurations are shown in FIGS. 8A-D. FIG. 8A shows a commercially available AFM cantilever holder 800 (which may be mounted to a commercially available AFM head). As shown in expanded view of the white dotted circle of FIG. 8C, an AFM cantilever 803 is mounted to a substrate 802, which is mounted to a substrate holder 805 of the AFM cantilever holder 800. The AFM cantilever 803 includes a probe (tip) 804 onto which a WGM optical resonator (not shown due to small size) is mounted. (It is noted that, also due to its small size, the AFM cantilever 803/probe (tip) 804/WGM optical resonator assembly is not clearly visible or labeled in FIGS. 8A, 8B and 8D. It is also noted that the expanded view shows a front, perspective view of the assembly while the view of FIG. 8C is a top, plan view.) In this embodiment, the AFM cantilever holder 800 has been modified to include an evanescent coupler positioner 806 mounted thereon. The positioner 806 is configured to achieve lateral adjustment (in-plane) and vertical adjustment via a lateral adjustment screw 808 and a vertical adjustment screw 810, respectively. Lateral adjustment (illustrated in FIG. 8B) is used to bring the evanescent coupler into position above the WGM optical resonator while vertical adjustment is used to bring the evanescent coupler sufficiently close to the WGM resonator so that the WGM resonator is within the evanescent field of the evanescent coupler. An evanescent coupler such as a tapered or thinned optical fiber (FIG. 8C) or a Dove prism (FIG. 8D) may be mounted to the evanescent coupler positioner 806.

In another embodiment, a WGM optical resonator (e.g., a spherical WGM optical resonator) may be formed at the end of a tapered optical fiber using heat. As described above, the tapered optical fiber can serve as an evanescent-field coupler to couple the excitation light into the WGM optical resonator. However, in this embodiment, by also operably coupling the tapered optical fiber to the AFM system as described above, the tapered optical fiber can also serve as the AFM cantilever itself.

In the disclosed methods, light derived from the excitation light is detected by an appropriate detector, e.g., a photodiode. This light may be evanescently scattered light from the WGM optical resonator which is generated via the excitation of a whispering gallery mode in the WGM optical resonator, wherein a maximum value of the evanescently scattered light indicates resonant coupling of the excitation light into the WGM optical resonator. Alternatively, this light may be excitation light which is transmitted by the WGM optical resonator during the light coupling process, wherein a minimum value of the transmission indicates resonant coupling of the excitation light into the WGM optical resonator. Detection of the light derived from the excitation light enables the detection and quantification of changes in scattering intensity or transmission. For example, when the excitation light is fixed to a wavelength which substantially matches a resonance frequency of the WGM optical resonator, such changes are indicative of, and quantitatively related to, shifts in the resonance frequencies of the WGM optical resonator due to changes in the effective refractive index of the WGM optical resonator and thus, changes in the refractive index of the surface being characterized by the disclosed methods.

In the disclosed methods, the WGM optical resonator is positioned at various locations over the surface of the sample. The positioning of the WGM optical resonator may be accomplished by moving the AFM cantilever (to which the WGM optical resonator is mounted) relative to the surface of the sample or by moving the surface of the sample relative to the AFM cantilever or some combination thereof. In other words "positioning the WGM optical resonator" encompasses physically moving the AFM cantilever/WGM optical resonator as well as physically moving the surface of the sample. The dimension of the gap between the surface of the WGM optical resonator and the surface of sample when the WGM optical resonator is in position over the surface of the sample may be sufficiently minimized such that the evanescent field emanating from the surface of the WGM optical resonator (generated via the excitation of a whispering gallery mode) sufficiently extends into the surface of the sample. The surface of the WGM optical resonator may be substantially in contact with the surface of the sample.

The types of samples to be characterized by the disclosed methods are generally not limited. Illustrative samples include thin films, e.g., thin polymer films; lipid membranes;

and binding assays comprising a layer or an array of biological molecules (e.g., proteins, antibodies, enzymes, oligonucleotides, etc.) capable of binding to target analytes. Such arrays may comprise a plurality of regions wherein each region comprises a layer of biological molecules. Individual regions of the plurality of regions may comprise different types of biological molecules so as to be sensitive to different types of analytes. The samples may be deposited or grown on a variety of substrates, e.g., glass substrates.

The WGM optical resonator may also be used to generate an additional optical signal, e.g., fluorescence, simultaneously with the topological and surface refractive index information, thereby adding another contrast mechanism to the disclosed methods. Thus, the disclosed methods may further comprise detecting fluorescence from the sample. In some embodiments, the fluorescence is from fluorescing species in the sample. When the WGM optical resonator is excited at a resonance frequency and excitation light circulates within the WGM optical resonator, the evanescent field emanating from the outer surface of the WGM optical resonator may be used to excite such fluorescing species, leading to a fluorescence signal generated at nearest contact between the WGM optical resonator and the sample. For example, evanescently scattered light from the WGM optical resonator can be detected and used to quantify refractive index as described above, while another detector can detect fluorescence by detecting light from the sample after it is sent through a long pass filter to remove excitation light. Given the decay length of the evanescent field emanating from the outer surface of the WGM optical resonator, this embodiment is useful for detecting fluorescing species in the sample that are within about 100 nm to about 200 nm of the WGM optical resonator.

In other embodiments, the WGM optical resonator may be used to provide energy transfer measurements wherein the fluorescence is from a fluorescence resonance energy transfer (FRET) pair of molecules (e.g., dye molecules). For example, a donor (or acceptor) dye molecule of a FRET pair can label the sample and the acceptor (or donor) dye molecule of the FRET pair can be attached to the WGM optical resonator. Methods for attaching dye molecules are known, e.g., see Vickery et al., "Scanning Near-Field Fluorescence Resonance Energy Transfer Microscopy," *Biophysical Journal*, Volume 76, April 1999, 1812-1818, which is hereby incorporated by reference in its entirety. Moreover, fluorescent dyes may be attached to WGM optical resonators without substantial degradation in performance (i.e., Q-factors). Next, donor dye molecules are excited (e.g., by the evanescent field emanating from the outer surface of the WGM optical resonator). As the distance between the donor dye molecules and acceptor dye molecules decreases (i.e., as the WGM optical resonator and sample surface get closer), energy transfer can occur, generating a fluorescence signal from the acceptor dye molecules which may be detected as described above. The FRET process is strongly dependent upon distance so only donor-acceptor dye molecules within a few nanometers of each other will efficiently transfer their energy, thus providing a very sensitive proximity probe. For example, this embodiment may be used to discriminate between species located on either side of a biological membrane.

In another aspect, SRM systems for carrying out the disclosed methods are provided. In one embodiment, the SRM system comprises a stage configured to support a sample; a WGM optical resonator mounted to the free end of an AFM cantilever; a AFM system configured to provide a topographical image of the sample, wherein the AFM cantilever is operably coupled to the AFM system; optical components configured to couple excitation light into the WGM optical resonator; and a detector configured to detect light derived from the excitation light. The system may further comprise a light source, e.g., a laser, configured to generate the excitation light. If fluorescence or another optical signal is to be detected as described above, the system may further comprise an additional detector. The system may further comprise a variety of optical components configured to direct and shape the excitation light and optical components configured to collect, direct and shape the detected light. Optical components may include, e.g., lenses, prisms, microscope objectives, fiber optics, mirrors, beamsplitters, etc. The system may further comprise a variety of electrical or mechanical components typically associated with AFM systems. The system may further comprise a variety of electrical components for coupling excitation light into WGM optical resonators or otherwise manipulating excitation light. Such electrical components may include, e.g., lock-in amplifiers, PDH servo loops, etc.

Regarding lock-in amplifiers, in some embodiments, the system further comprises a phase sensitive lock-in detection system operably coupled to the light source configured to generate the excitation light and to the detector configured to detect light derived from the excitation light. The phase sensitive lock-in detection system may be configured to modulate a wavelength of the excitation light at a selected frequency and to monitor for shifts in the resonance frequencies of the WGM optical resonator via phase changes with respect to a reference signal. For example, the phase sensitive lock-in detection system may comprise a function generator, a lock-in amplifier, and a track and hold circuit. The function generator may be used to modulate the wavelength of the excitation light at the selected frequency as well as to provide the reference signal for the lock-in amplifier. The track and hold circuit may be used to eliminate any redundant signal generated at the detector due to the modulated excitation light. The lock-in amplifier may be used to detect shifts in the resonance frequencies of the WGM optical resonator through phase changes with respect to the reference signal. An exemplary phase sensitive lock-in detection system is further described at Kim et al., "Integrating Whispering Gallery Mode Refractive Index Sensing with Capillary Electrophoresis Separations Using Phase Sensitive Detection," *Analytical Chemistry*, 2016, 88, 1426-1433, which is hereby incorporated by reference in its entirety. Use of phase sensitive lock-in detection allows for tracking spectral shifts in real time. Therefore, each pixel in a topographical image can be correlated with a shift in the resonance frequencies of the WGM optical resonator (and thus, with a change in the surface refractive index).

FIG. 1B shows an illustrative SRM system. The SRM system may comprise fewer, additional, or different components as compared to those shown in FIG. 1B, e.g., depending upon the type of AFM cantilever and AFM system, the type of WGM optical resonator, the type of technique used to couple the excitation light and the type of detector.

EXAMPLES

Overview

These Examples illustrate the technique of scanning resonator microscopy (SRM) in which whispering gallery mode (WGM) sensing is integrated with atomic force microscopy (AFM). The hybrid technique combines the exquisite refractive index sensing of whispering gallery mode resonators with the topography mapping capabilities of AFM. A 45 μm diameter barium titanate microsphere was attached to the end of a conventional AFM cantilever and acts as both a WGM resonator and stylus for mapping surface topography. Calibration plots, taken in contact-mode feedback, show that the WGM spectrum responds to changes in both solution and substrate refractive index. SRM imaging of a glass substrate reveals changes in surface refractive index that correspond to a small, 36 nm high feature measured simultaneously in the contact-mode topography image. Spectral measurements confirm that the contrast arises from refractive index changes and not coupling with sample topography, thus validating the technique. Additional measurements on thin polymer films and protein coated surfaces are provided and discussed.

Methods

SRM Imaging and Spectral Measurements:

45 μm diameter barium titanate microresonators (Mo-Sci Corporation) were attached to the sides of conventional AFM cantilevers (MikroMasch CSC38) using UV curable adhesive (Loctite 3525). The modified microresonator tip was held in a Dimension AFM head (Digital Instruments) that uses laser light reflected from the end of the tip to generate the feedback signal. The sample was mounted below the tip on a Dove prism, which was held in an x-y closed-loop piezo scanner (Physik Instrumente) that raster scanned the sample. Both AFM head and sample scanner were mounted on an inverted optical microscope (Zeiss Axiovert 135) using a design similar to the Bioscope AFM (Digital Instruments).

WGM excitation from a tunable diode laser centered at 635 nm (New Focus Vortex II TLB-6900) was focused into the Dove prism, which refracts the light to the sample interface at an angle leading to total internal reflection. The evanescent field at the sample surface can couple light into the microresonator as the modified AFM tip is lowered into the field. To measure tip WGM resonances, the wavelength of the laser was scanned as evanescently scattered excitation from the tip is collected from below with the inverted microscope (Olympus Plan N 4×, 0.10 NA) and detected on an avalanche photodiode (APD) detector (SPCM-200, EG&G). Laser control, sample scanning, tip feedback, and signal collection were all integrated with a modified AFM controller and software (Digital Instruments Nanoscope IIIa).

All measurements were done with the microresonator tip held at the sample surface in contact-mode feedback. For SRM imaging, the diode laser was tuned to the WGM resonance of the tip and held at that wavelength during imaging. To calibrate the response of each tip, substrate refractive index was varied as indicated (ESCO Optics). All calibrations were done without sample scanning while holding the tip in feedback mode on the surface. All spectral measurements and imaging were carried out at room temperature, and under aqueous or dry conditions as specified.

AZ1518 Thin Films:

To prepare polymer thin films, unmodified AZ1518 (AZ Electronic Materials) was spin cast (Brewer Science Cee 100) onto clean microscope slides (Fisherbrand cover glass) to a thickness of 1-2 microns, as verified using surface profilometry (Tencor Alphastep 200). Custom photolithography masks were designed in AutoCAD and fabricated by Infinite Graphics, Inc. Films were soft baked (2 min. at 100° C.), aligned with the mask, and then exposed to 365 nm radiation (ABM Mask Aligner, i-line flood source) to modify the polymer structure. Exposure times varied from 15 to 30 seconds. Following exposure, samples were hard baked (10 min. at 100° C.) to remove residual solvent and increase the refractive index contrast. SRM measurements were carried out in air using contact-mode AFM feedback at room temperature.

Protein Coated Slides: Microscope slides were cleaned in Pirhana (70:30 $H_2SO_4$:$H_2O_2$) and subsequently rinsed with de-ionized water, ethanol, and toluene. Pirhana solution is extremely dangerous and should only be used in a properly vented hood using appropriate attire and precautions. The clean slides were reacted in 5% (3-aminopropyl)triethoxysilane (APTES)/toluene for approximately 2 hours, rinsed in toluene, ethanol, and finally phosphate buffered saline (PBS). The functionalized slides were incubated in 5% gluteraldehyde in PBS for 1 hour. Aldehydes on the surface were reacted with bovine serum albumin (BSA)-biotin (Thermo Scientific) which was then incubated with streptavidin (Thermo Scientific). SRM experiments comparing bare glass slides with protein coated surfaces were carried out in PBS at room temperature. All reagents were purchased from Fisher Scientific unless otherwise noted.

Results and Discussion

To integrate WGM sensing with AFM, a small microsphere resonator was attached to the end of a conventional AFM cantilever. As show in FIG. 1A, a 45 μm diameter barium titanate microsphere (Mo-Sci Corporation) was attached to the end of an AFM cantilever using UV curable adhesive. The AFM cantilever shown is 350 μm long and 32.5 μm wide, with a nominal spring constant of 0.03 N/m (MikroMasch, CSC38). The microsphere resonator was attached to the side of the cantilever to leave a pristine path around the sphere to support WGM resonances.

The microresonator tip was mounted in a Dimension AFM head that was incorporated into a modified Bioscope AFM (Digital Instruments), as shown schematically in FIG. 1B. The AFM was built on an inverted optical microscope (Zeiss Axiovert 135) equipped with a 4× objective (Olympus PlanN, 0.10 NA). The sample was mounted below the AFM head on a Dove prism (Edmund Scientific) which was held in a closed-loop x-y piezo stage (Physik Instrumente). The xy piezo stage raster scanned the sample below the microresonator tip while the z-piezo of the AFM head (x and y piezos disabled) adjusted the tip-sample gap in contact-mode feedback.

To excite WGM modes in the microresonator tip, light from a tunable diode laser (New Focus Vortex II TLB-6900, center wavelength 635 nm) was focused into the Dove prism.[37-38] Light entering the Dove prism was refracted towards the transparent sample at an angle leading to total internal reflection at the interface. The associated evanescent field at the sample surface coupled radiation into the microresonator tip as it nears the surface. To measure the WGM resonance, evanescently scattered light from the resonator was collected with the microscope objective and detected on an avalanche photodiode (APD) detector (SPCM-200, EG&G). The large size of the resonator compared with the rapid decay of the evanescent field leads to scatter dominated by the lower region of the resonator, closest to the sample surface.[39-41] This results in a well-defined spot of scattered radiation from the side of the resonator that is easily collected and imaged onto the detector. The output of the APD detector was sent to a photon counting module in the AFM controller (Digital Instruments Nanoscope IIIa), which controls sample scanning and data acquisition.

FIG. 1C shows the WGM spectrum of the modified microresonator AFM tip shown in FIG. 1A. The WGM resonance was measured while the tip was held in contact-mode feedback at a glass surface under aqueous conditions.

Spectra were measured by collecting evanescently scattered light as the wavelength of the tunable diode laser is swept.[39-41] Typical Q-factors measured for the modified microresonator AFM tips ranged from $5\times10^4$ to $1\times10^6$. The particular spectrum shown in FIG. 1C, for example, indicates a measured Q-factor of $1\times10^5$ which is likely limited by over-coupling arising from the direct contact between the microresonator tip and sample surface.[42]

Figure 2B:
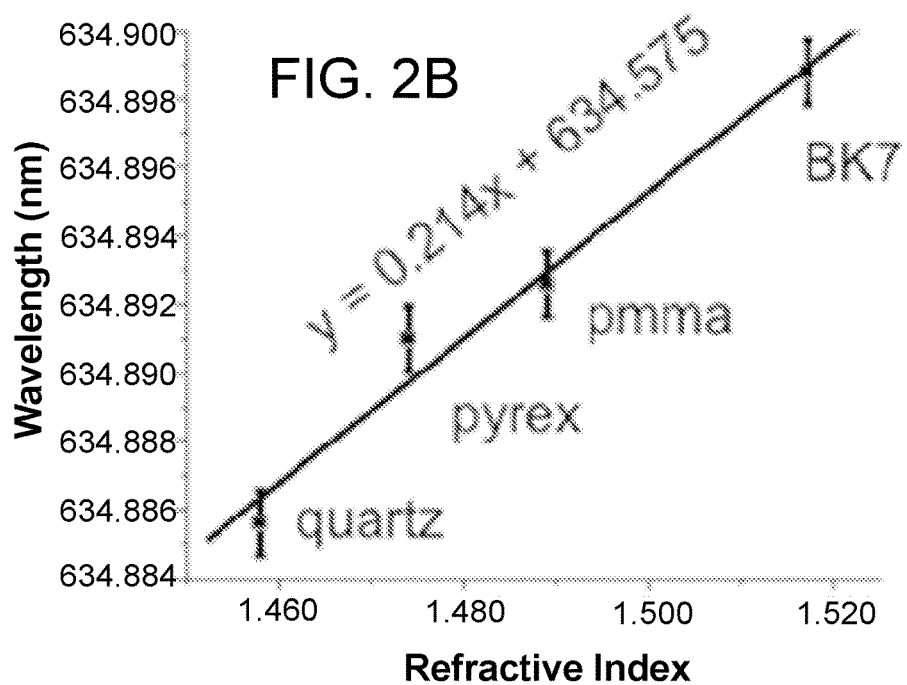

To show that the microresonator tip responds as expected, FIG. 2A plots the shifts in the WGM resonance as the refractive index of the surrounding solution was systematically increased with sucrose concentration (degrees Brix). A linear red shift in WGM resonant wavelength with refractive index is observed in accordance with Equation 1. However, since SRM is a surface technique, calibrating the refractive index response through changes in the surrounding solution does not accurately mimic the experimental measurable. FIG. 2B, therefore, shows a second calibration plot using the same microresonator tip, calibrated using changes in the substrate refractive index. In these measurements, the surrounding bath refractive index was held constant (nanopure water) while the surface refractive index was varied by changing the substrate. FIG. 2B shows the linear response of the resonator to surface refractive index, albeit with reduced sensitivity due to the limited region of interaction between the resonator and the surface.

Having demonstrated that a microresonator tip responds to surface refractive index, FIGS. 3A-3E show initial SRM imaging measurements. For these measurements, the microsphere resonator acts as both the stylus to sense sample topography in contact-mode feedback and WGM resonator that responds to changes in surface refractive index. FIGS. 3A and B show 15 µm×15 µm topography and SRM optical images, respectively, of a cleaned glass microscope slide under aqueous conditions. The image in FIG. 3B was measured with the excitation wavelength held constant at 634.842 nm, corresponding to the WGM resonance of the microresonator tip on the glass surface. The topography image revealed a small 36 nm high feature in the middle of the image due to contamination on the otherwise smooth glass surface. This feature corresponds to a large change in intensity observed in the corresponding WGM image. A large, reversible decrease in the evanescently scattered light from the microresonator tip was observed in FIG. 3B as the microresonator tip was scanned across the feature.

To confirm that the WGM contrast seen in FIG. 3B arises from spectral shifts and not coupling with the surface topography, the microresonator tip was positioned and held at the locations indicated in FIG. 3C while spectra were recorded. With the tip positioned 10 µm on either side of the feature, the WGM spectrum indicates a resonant wavelength at 634.842 nm. When the tip is centered on the feature, the WGM spectrum red shifts to 634.846 nm indicating a larger refractive index than the surrounding glass substrate. These measurements confirm that the intensity contrast measured in FIG. 3B arises from variations in sample refractive index and not coupling between the topography and optical signals. This is further confirmed in FIGS. 3D and E, where the same sample area was imaged again but with the excitation wavelength tuned to match the WGM resonance of the tip on the feature at 634.846 nm. An increase in evanescent scattering from the tip is now observed at the center of the image as the microresonator tip comes into resonance when it crosses the sample feature. For the images shown in FIGS. 3A-3E, the actual size of the feature on the surface is smaller than the microresonator tip used in the imaging. AFM tips modified with 45 µm resonators routinely lead to a spatial resolution of approximately 2 µm. Resolution can be improved using smaller resonators, provided the resonator is still capable of supporting WGM resonances.

The measurements in FIGS. 3A-3E illustrate the surface refractive index sensing capabilities of SRM, which is particularly useful for characterizing thin polymer films. Thin polymer films are rapidly emerging as important materials for photonic applications where refractive index structures can be engineered into the films.[20-22] FIGS. 4A-4B shows an SRM measurement on a thin film of the photoreactive polymer AZ1518. This photoresist is used extensively in microfabrication applications where thin films are easily fabricated on substrates by spin casting.[43] AZ1518 has a refractive index of 1.623 (632.8 nm), which shifts to lower values upon exposure to UV radiation as diazonaphthoquinone (DNQ) in the polymer undergoes a series of physicochemical changes that ultimately converts it to a carboxylic acid.[44-46] The final refractive index change in the exposed film depends on the degree of photoactivation and the amount of residual solvent remaining in the film following post exposure baking.[47]

To create refractive index test samples, standard photolithography techniques were used to expose thin films of AZ1518 to UV radiation through the mask shown in FIG. 4A. Following exposure, the films were baked to remove residual solvent but not processed further, leaving smooth polymer films with refractive index features encoded by the mask. FIG. 4B shows a representative refractive index image of the thin film taken with SRM. The particular 45 µm diameter resonator tip used had a Q of $1\times10^5$ and images were collected while holding the excitation wavelength constant at 634.848 nm, corresponding to the tip resonance in contact with the unexposed regions of the polymer. In FIG. 4B, a reversible shift in contrast is observed as the microresonator tip scans across the exposed regions of the polymer film, accurately mapping the exposed mask feature. The lower intensity reflects reduced scattering from the microresonator tip as the change in refractive index shifts its WGM resonance. It is important to note that these films were imaged following exposure to UV light without any further development in order to visualize the structures.

Figure 5:
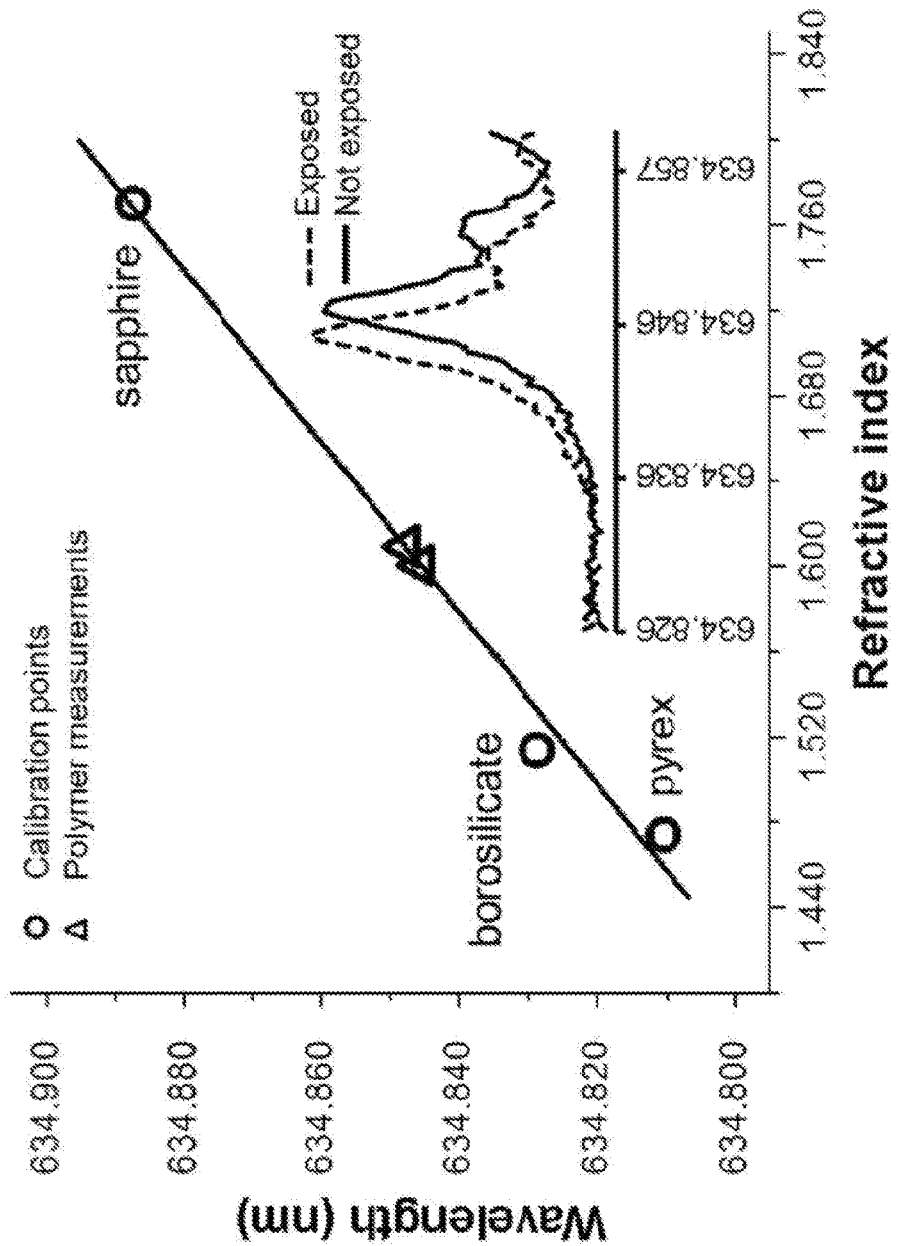
FIG. 5 shows the calibration plot (circles) of the microresonator tip used in FIGS. 4A-4B to quantify the changes in refractive index between exposed and unexposed regions of the polymer film (triangles). From this, the measured refractive index of exposed regions is 1.600 and that of areas not exposed is 1.610. Spectra were collected in air at room temperature.

To gain a more quantitative view of the refractive index differences between the exposed and unexposed regions of AZ1518 films, spectra were collected in both regions and the resonator was calibrated. The calibration plot shown in FIG. 5 was used to calculate the refractive index values for both exposed and unexposed regions of the polymer film based on the measured WGM resonant wavelength of the tip in these regions (inset FIG. 5). From FIG. 5, the measured refractive index in unexposed regions is 1.610. This is lower than literature values of 1.623.[45] This difference may reflect residual solvent in the films or unintended exposure of these regions, both of which will lower film refractive index.[47] In exposed regions of the polymer, the measured refractive index is 1.600, reflecting the expected shift to lower refractive index following UV exposure.

Figure 6:
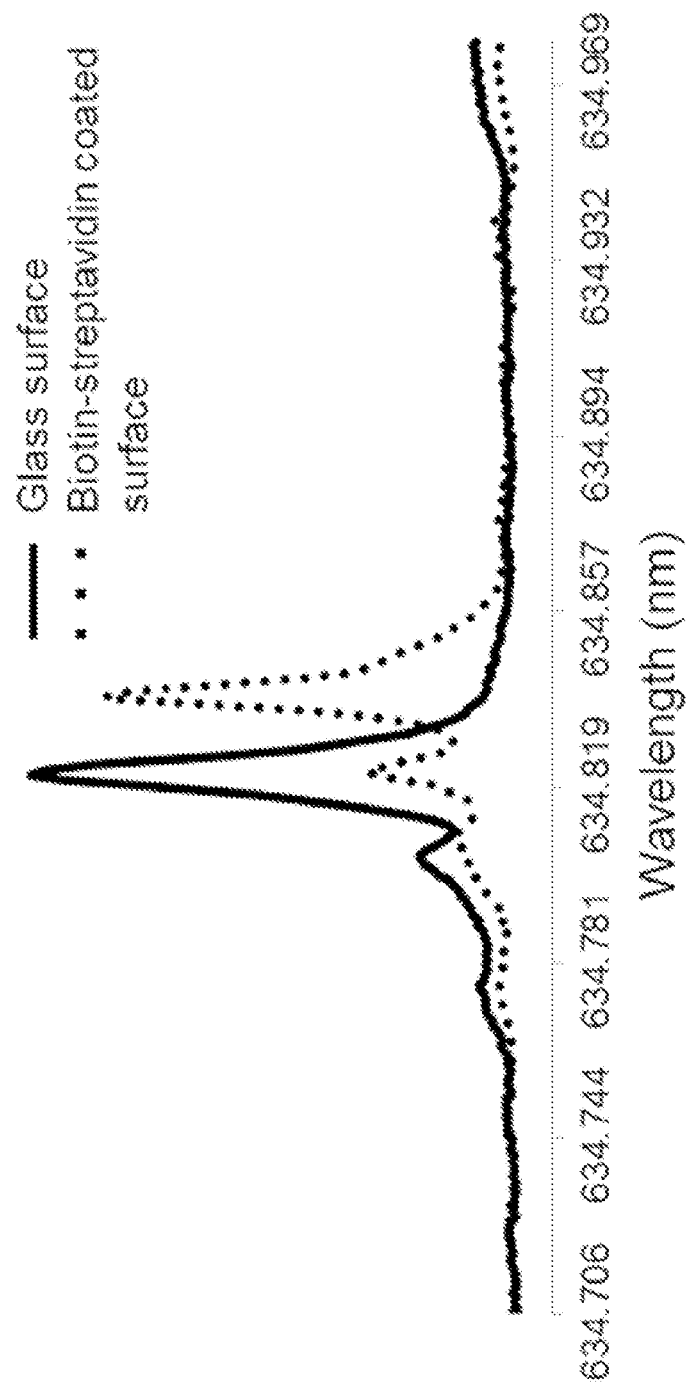
FIG. 6 shows shifts in the WGM resonance of a microresonator tip held in contact-mode feedback on a bare glass surface versus a biotin-streptavidin coated surface. Measurements were taken in PBS at room temperature.

Finally, experiments to explore the utility of SRM for characterizing binding at surfaces were conducted. FIG. 6, for example, compares WGM spectra taken with SRM in PBS buffer on a bare glass substrate compared with that taken on a glass surface coated with protein. For the protein surface, bovine serum albumin-biotin was covalently attached to a glass slide, which was then incubated with streptavidin in PBS. Red shifts in the measured WGM resonance are observed on the protein coated surface, consistent with the presence of the biotin-streptavidin complex. FIG. 6 shows that the WGM resonator can be used to monitor binding at surfaces. Moreover, the same resonator may be used to monitor binding of multiple analytes at various sites, thus alleviating issues in calibration and varying resonator Q-factors. This also introduces a quantitative, high resolution approach for monitoring binding at high-density surface arrays that does not require the introduction of labels.

CONCLUSION

In the SRM approach, whispering gallery mode sensing is combined with AFM to simultaneously characterize refractive index and surface topography. The data shown validate the SRM approach and illustrate the flexibility of the approach for characterizing refractive index structures at surfaces. WGM sensing can routinely characterize refractive index changes less than $10^{-7}$ RIU and mapping these changes with high spatial resolution provides a new tool for material characterization.[35] By contrast to techniques based on AFM and either surface plasmon resonance or ellipsometry, the SRM approach is capable of providing higher spatial resolution and a direct pixel by pixel comparison between an optical image and a topographical image. The SRM approach is also capable of reduced coupling between the optical and topographical images, thereby simplifying image analysis.

Refractive index measurements are also used in sensing applications where binding events are quantified.[23-25, 37-38] SRM enables similar measurements at surfaces. By contrast to conventional sensing applications, the SRM approach does not require resonator functionalization, thereby allowing the same microresonator tip to be used to quantify binding at several sites. The SRM approach, therefore, simplifies calibration, reduces complications arising from Q variation among resonators, and dovetails nicely with progress being made in fabricating high-density arrays.

Scanning Resonator Microscopy of Polymeric Thin Films

A 1% solution of AF2400 resin in fluorinated solvent FC40 was spin cast onto a glass substrate to produce a thin film. SRM measurements were carried out as described in the example above. The topography image in FIG. 7A reveals semi-circular domains approximately 50-150 nm high. The corresponding SRM optical image in FIG. 7B shows decreased scattering from these features. Much darker contrast in the SRM optical image arises from small particles with heights ranging from 3-30 nm. These particles are observed decorating the larger domains and isolated in the smooth regions between domains. These particles correspond to large decreases in intensity in the SRM optical contrast even though their height is modest. This is most clearly seen in the expanded regions shown in FIG. 7C (white dotted square of FIG. 7A) and 7D (black dotted square of FIG. 7B). The measured particle height of 9 nm is near the expected globule size of the polymer particles (6 nm) and the large contrast observed in the SRM optical image is consistent with the low refractive index of the AF2400 polymer.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

REFERENCES

1. Cricenti, A.; Colonna, S.; Girasole, M.; Gori, P.; Ronci, F.; Longo, G.; Dinarelli, S.; Luce, M.; Rinaldi, M.; Ortenzi, M., Scanning probe microscopy in material science and biology. *J. Phys. D: Appl. Phys.* 2011, 44 (46), 1-23.
2. Raigoza, A. F.; Dugger, J. W.; Webb, L. J., Review: Recent Advances and Current Challenges in Scanning Probe Microscopy of Biomolecular Surfaces and Interfaces. *ACS Appl. Mater. Interfaces* 2013, 5 (19), 9249-9261.
3. Eifert, A.; Kranz, C., Hyphenating Atomic Force Microscopy. *Anal. Chem.* 2014, 86 (11), 5190-5200.
4. Binnig, G.; Quate, C. F.; Gerber, C., Atomic Force Microscope. *Phys. Rev. Lett.* 1986, 56 (9), 930-933.
5. Shao, Z.; Mou, J.; Czajkowsky, D. M.; Yang, J.; Yuan, J.-Y., Biological atomic force microscopy: What is achieved and what is needed. *Adv. Phys.* 1996, 45 (1), 1-86.
6. Giessibl, F. J., Advances in atomic force microscopy. *Rev. Mod. Phys.* 2003, 75 (3), 949-983.
7. Flores, S. M.; Toca-Herrera, J. L., The new future of scanning probe microscopy: combining atomic force microscopy with other surface-sensitive techniques, optical microscopy and fluorescence techniques. *Nanoscale* 2009, 1 (1), 40-49.
8. Kranz, C., Recent advancements in nanoelectrodes and nanopipettes used in combined scanning electrochemical microscopy techniques. *Analyst* 2014, 139 (2), 336-352.
9. Barattin, R.; Voyer, N., Chemical modifications of AFM tips for the study of molecular recognition events. *Chem. Commun.* 2008, (13), 1513-1532.
10. Frisbie, C. D.; Rozsnyai, L. F.; Noy, A.; Wrighton, M. S.; Lieber, C. M., Functional group imaging by chemical force microscopy. *Science* 1994, 265 (5181), 2071-2074.
11. Palacio, M. L. B.; Schricker, S. R.; Bhushan, B., Protein conformation changes on block copolymer surfaces detected by antibody-functionalized atomic force microscope tips. *J. Biomed. Mater. Res., Part A* 2012, 100A (1), 18-25.
12. Amemiya, S.; Bard, A. J.; Fan, F.-R. F.; Mirkin, M. V.; Unwin, P. R., Scanning electrochemical microscopy. *Annu. Rev. Anal. Chem.* 2008, 1, 95-131.
13. Derylo, M. A.; Morton, K. C.; Baker, L. A., Parylene Insulated Probes for Scanning Electrochemical-Atomic Force Microscopy. *Langmuir* 2011, 27, 13925-13930.
14. Kueng, A.; Kranz, C.; Lugstein, A.; Bertagnolli, E.; Mizaikoff, B., Integrated AFMSECM in tapping mode: Simultaneous topographical and electrochemical imaging of enzyme activity. *Angew. Chem., Int. Ed. Engl.* 2003, 42 (28), 3238-3240.
15. Huang, K.; Anne, A.; Bahri, M. A.; Demaille, C., Probing Individual Redox PEGylated Gold Nanoparticles by Electrochemical-Atomic Force *Microscopy. ACS Nano* 2013, 7 (5), 4151-4163.

16. Schmid, T.; Opilik, L.; Blum, C.; Zenobi, R., Nanoscale chemical imaging using tip-enhanced Raman spectroscopy: a critical review. *Angew. Chem., Int. Ed. Engl.* 2013, 52 (23), 5940-5954.
17. Dunn, R. C., Near-Field Scanning Optical Microscopy. *Chem. Rev.* 1999, 99 (10), 2891-2927.
18. Betzig, E.; Chichester, R. J., Single molecules observed by near-field scanning optical microscopy. *Science* 1993, 262 (5138), 1422-1425.
19. Hecht, B.; Bielefeldt, H.; Inouye, Y.; Pohl, D. W., Facts and artifacts in near-field optical microscopy. *J. Appl. Phys.* 1997, 81 (6), 2492-2498.
20. Ma, H.; Jen, A. K. Y.; Dalton, L. R., Polymer-based optical waveguides: materials, processing, and devices. *Adv. Mater.* 2002, 14 (19), 1339-1365.
21. Boehm, J.; Hausselt, J.; Henzi, P.; Litfin, K.; Hanemann, T., Tuning the refractive index of polymers for polymer waveguides using nanoscaled ceramics or organic dyes. *Adv. Eng. Mater.* 2004, 6 (1-2), 52-57.
22. Flory, F.; Escoubas, L., Optical properties of nanostructured thin films. *Prog. Quantum Electron.* 2004, 28, 89-112.
23. Vollmer, F.; Arnold, S., Whispering-gallery-mode biosensing: label-free detection down to single molecules. *Nat. Methods* 2008, 5 (7), 591-596.
24. Fan, X.; White, I. M.; Shopova, S. I.; Zhu, H.; Suter, J. D.; Sun, Y., Sensitive optical biosensors for unlabeled targets: A review. *Anal. Chim. Acta* 2008, 620 (1-2), 8-26.
25. Kindt, J. T.; Bailey, R. C., Biomolecular analysis with microring resonators: applications in multiplexed diagnostics and interaction screening. *Curr. Opin. Chem. Biol.* 2013, 17 (5), 818-826.
26. Chen, X.; Shakesheff, K. M.; Davies, M. C.; Heller, J.; Roberts, C. J.; Tendler, S. J. B.; Williams, P. M., Degradation of a Thin Polymer Film Studied by Simultaneous in Situ Atomic Force Microscopy and Surface Plasmon Resonance Analysis. *J. Phys. Chem.* 1995, 99, 11537-11542.
27. Servoli, E.; Maniglio, D.; Aguilar, M. R.; Motta, A.; San Roman, J.; Belfiore, L. A.; Migliaresi, C., Quantitative analysis of protein adsorption via atomic force microscopy and surface plasmon resonance. *Macromol. Biosci.* 2008, 8 (12), 1126-1134.
28. Karageorgiev, P.; Orendi, H.; Stiller, B.; Brehmer, L., Scanning near-field ellisometric microscope-imaging ellipsometry with a lateral resolution in nanometer range. *Appl. Phys. Lett.* 2001, 79 (11), 1730-1732.
29. Tranchida, D.; Diaz, J.; Schoen, P.; Schoenherr, H.; Vancso, G. J., Scanning near-field ellipsometry microscopy: imaging nanomaterials with resolution below the diffraction limit. *Nanoscale* 2011, 3 (1), 233-239.
30. Butt, H.-J.; Cappella, B.; Kappl, M., Force measurements with the atomic force microscope: Technique, interpretation and applications. *Surf Sci. Rep.* 2005, 59 (1-6), 1-152.
31. Amini, S.; Sun, Z.; Meininger, G. A.; Meissner, K. E., Using the atomic force microscope as a nanomechanical partner to support evanescent field imaging. *Eur. Phys. J.* 2014, (223), 2023-2033.
32. Ghislain, L. P.; Elings, V. B., Near-field scanning solid immersion microscope. *Appl. Phys. Lett.* 1998, 72 (22), 2779-2781.
33. Stuart, J. K.; Hlady, V., Reflection interference contrast microscopy combined with scanning force microscopy verifies the nature of protein-ligand interaction force measurements. *Biophys. J.* 1999, 76, 500-508.
34. Vahala, K. J., Optical microcavities. *Nature* 2003, 424, 839-46.
35. Hanumegowda, N. M.; Stica, C. J.; Patel, B. C.; White, I.; Fan, X., Refractometric sensors based on microsphere resonators. *Appl. Phys. Lett.* 2005, 87 (20), 1-3.
36. Matsko, A. B.; Ilchenko, V. S., Optical resonators with whispering-gallery modes-part I: basics. *IEEE I Sel. Top. Quantum Electron.* 2006, 12 (1), 3-14.
37. Huckabay, H. A.; Dunn, R. C., Whispering gallery mode imaging for the multiplexed detection of biomarkers. *Sens. Actuators*, B 2011, 160 (1), 1262-1267.
38. Huckabay, H. A.; Wildgen, S. M.; Dunn, R. C., Label-free detection of ovarian cancer biomarkers using whispering gallery mode imaging. *Biosens. Bioelectron.* 2013, 45, 223-229.
39. Ganic, D.; Gan, X. S.; Gu, M., Three-dimensional evanescent wave scattering by dielectric particles. *Optik* 2002, 113 (3), 135-141.
40. Chew, H.; Wang, D. S.; Kerker, M., Elastic scattering of evanescent electromagnetic waves. *Appl. Opt.* 1979, 18 (15), 2679-2687.
41. Ashkin, A.; Dziedzic, J. M., Observation of optical resonances of dielectric spheres by light scattering. *Appl. Opt.* 1981, 20 (10), 1803-1814.
42. Yariv, A., Critical coupling and its control in optical waveguide-ring resonator systems. *Ieee Photonics Technol. Lett.* 2002, 14 (4), 483-485.
43. Mendes, L. A. V.; Pinho, R. R.; Avila, L. F.; Lima, C. R. A.; Rocco, M. L. M., AZ-1518 Photoresist analysis with synchrotron radiation using high-resolution time-of-flight mass spectrometry. *Polym. Degrad. Stab.* 2007, 92 (6), 933-938.
44. Avila, L. F.; Lima, C. R. A., Dill's parameter measure in liquid photosensitive materials via interferometric method. *Eur. Polym. J.* 2007, 43 (5), 2041-2045.
45. Norwood, R. A.; Whitney, L. A., Rapid and accurate measurements of photoresist refractive index dispersion using the prism coupling method. *Proc. SPIE-Int. Soc. Opt. Eng.* 1996, 2725, 273-280.
46. Henderson, C. L.; Willson, C. G.; Dammel, R. R.; Synowicki, R. A., Bleaching-induced changes in the dispersion curves of DNQ photoresists. *Proc. SPIE-Int. Soc. Opt. Eng.* 1997, 3049, 585-595.
47. Ficner, S.; Dammel, R. R.; Perez, Y.; Gardiner, A.; Willson, C. G., Refractive indexes in thick photoresist films as a function of bake conditions and film exposure. *Proc. SPIEInt. Soc. Opt. Eng.* 1997, 3049, 838-849.

What is claimed is:

1. A method of imaging a sample comprising:
   (a) positioning a whispering gallery mode (WGM) optical resonator at a first location over the surface of the sample, the WGM optical resonator characterized by at least one resonance frequency, wherein the WGM optical resonator is mounted to the free end of an atomic force microscopy (AFM) cantilever such that the WGM optical resonator moves with the AFM cantilever, and wherein the AFM cantilever is operably coupled to an AFM system configured to provide a topographical image of the sample;
   (b) evanescently coupling excitation light into the WGM optical resonator;
   (c) detecting light derived from the excitation light to monitor for a shift in the at least one resonance frequency of the WGM optical resonator; and
   (d) repeating steps (a)-(c) at least at a second location over the surface of the sample.

2. The method of claim 1, wherein steps (a)-(c) are repeated at a sufficient number of locations over the surface of the sample to generate an optical image of the sample via the WGM optical resonator simultaneously with the topographical image of the sample via the AFM system.

3. The method of claim 1, wherein the WGM optical resonator is characterized by a Q-factor of at least about $10^4$.

4. The method of claim 1, wherein the WGM optical resonator is a spherical optical resonator.

5. The method of claim 1, wherein the WGM optical resonator is mounted to a side surface of the AFM cantilever.

6. The method of claim 1, wherein the excitation light comprises a wavelength which substantially matches the at least one resonance frequency of the WGM optical resonator at the first location and the second location.

7. The method of claim 6, wherein the excitation light comprises a wavelength which substantially matches the at least one resonance frequency of the WGM optical resonator at each subsequent location over the surface of the sample.

8. The method of claim 1, wherein the detected light is evanescently scattered light from the WGM optical resonator.

9. The method of claim 1, wherein the detected light is excitation light transmitted by the WGM optical resonator.

10. The method of claim 1, wherein the excitation light is evanescently coupled via an evanescent-field coupler mounted to the AFM cantilever such that the evanescent-field coupler moves with the AFM cantilever.

11. The method of claim 1, wherein the AFM cantilever is a tapered optical fiber configured to evanescently couple the excitation light into the WGM optical resonator.

12. The method of claim 1, wherein the sample comprises an array comprising a plurality of regions, wherein each region comprises a layer of molecules, and wherein the first location is at one of the regions of the plurality of regions and the second location is at another region of the plurality of regions.

13. The method of claim 1, further comprising, prior to step (d), monitoring for a fluorescence signal, wherein step (d) involves repeating steps (a)-(c) and the step of monitoring for the fluorescence signal at least at the second location over the surface of the sample.

14. The method of claim 13, wherein each of the steps of the method are repeated at a sufficient number of locations over the surface of the sample to generate an optical image of the sample via the WGM optical resonator and a fluorescence image of the sample simultaneously with the topographical image of the sample via the AFM system.

15. The method of claim 1, wherein a wavelength of the excitation light is modulated at a selected frequency via a phase sensitive lock-in detection system and the shift in the at least one resonance frequency is monitored via phase changes with respect to a reference signal.

16. A scanning resonator microscopy system comprising:
(a) a stage configured to support a sample;
(b) a WGM optical resonator characterized by at least one resonance frequency mounted to the free end of an AFM cantilever such that the WGM optical resonator moves with the AFM cantilever;
(c) an AFM system configured to provide a topographical image of the sample, wherein the AFM cantilever is operably coupled to the AFM system;
(d) optical components configured to evanescently couple excitation light into the WGM optical resonator; and
(e) a detector configured to detect light derived from the excitation light to monitor for a shift in the at least one resonance frequency of the WGM optical resonator.

17. The scanning resonator microscopy system of claim 16, wherein the WGM optical resonator is characterized by a Q-factor of at least about $10^4$.

18. The scanning resonator microscopy system of claim 16, wherein the WGM optical resonator is mounted to a side surface of the AFM cantilever.

19. The scanning resonator microscopy system of claim 16, wherein at least some of the optical components configured to evanescently couple excitation light are mounted to the AFM cantilever such that they move with the AFM cantilever.

20. The scanning resonator microscopy system of claim 16, wherein the AFM cantilever is a tapered optical fiber and the tapered optical fiber provides at least some of the optical components configured to evanescently couple the excitation light into the WGM optical resonator.

* * * * *